Sept. 4, 1934.   G. H. SMITH ET AL   1,972,748
VALVE FOR FLUID PRESSURE REGULATORS
Filed Aug. 5, 1930
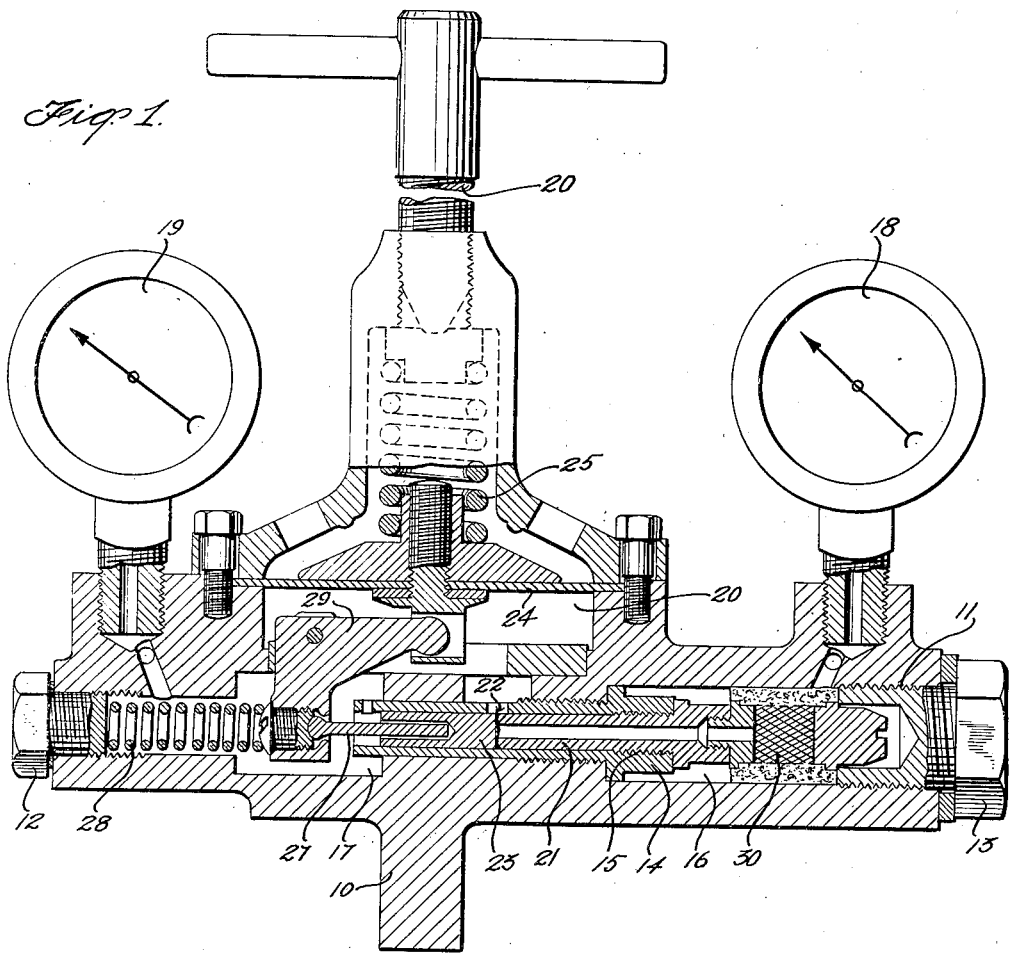
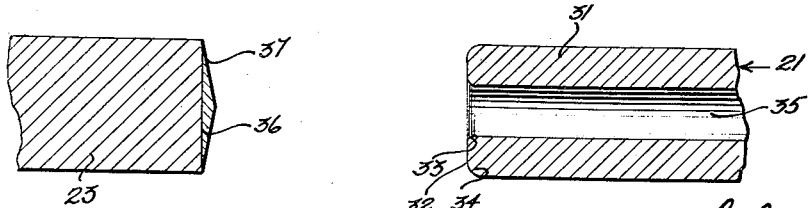
INVENTORS,
BY
ATTORNEYS.

UNITED STATES PATENT OFFICE

1,972,748

VALVE FOR FLUID PRESSURE REGULATORS

George H. Smith, Buffalo, N. Y., and Herman W. Carnes, Indianapolis, Ind., assignors to The Linde Air Products Company, a corporation of Ohio Application August 5, 1930, Serial No. 473,234

9 Claims. (Cl. 251—27)

This invention pertains in general to fluid pressure regulators and in particular to improvements in valves for such regulators, especially those adapted for reducing the pressure of oxygen from around 2300 lbs. to 50 lbs. or less as required for oxy-acetylene blowpipes.

The service requirements of such regulators are extremely exacting and variations in outlet pressure and degrees of valve leakage that would be of no consequence in other regulators are absolutely prohibitive.

In the prior art one of the seating surfaces of regulator valves has been made of a large number of organic materials such as hard rubber, casein compounds, fiber, phenol compounds such as bakelite, ivory, impregnated materials such as fiber, celluloid, horn, carboloid, rawhide, casenite and galalith.

Each of these materials are unsatisfactory on account of its failure to meet one or more of the following requirements of a valve for regulators of this class:

The valve should form a gas tight seal when closed with a low operating force against an oxygen pressure of 2300 lbs.

The material from which the valve parts are constructed should not burn in an atmosphere of oxygen at the above pressure when subjected to shock and a sharp rise in temperature resulting from the compression of the gas when it is turned into the regulator.

The valve parts should not corrode in an atmosphere of oxygen saturated with water vapor.

The valve parts should not swell, soften, or become deformed by moisture or gases for which the regulator is adapted.

The valve parts should not crack, harden, warp, soften, degenerate, or become otherwise deformed by changes in temperature between —40° F. and 250° F.

The valve parts should not deteriorate with age or become deformed or hardened by continual impact over a long period of time.

The valve parts should not be prohibitive in cost.

Of the organic materials hard rubber is probably the best, but it is unsatisfactory because it is subject to explosion when exposed to the sudden compression of oxygen at pressures below that of a full cylinder of oxygen at room temperature when compressed oxygen is turned into a regulator. Furthermore, due to the tenacity of rubber to resist any permanent change in form, particles of dust or dirt lodging on such a valve part will not become imbedded in it but will, on the other hand, tend to ruin it. A hard rubber valve seat will also take too deep an impression of the nozzle after continued service and this impairs the desirable characteristics of the regulator.

Metals have also been used as valve parts. Of these, the harder ones have been unsatisfactory on account of the great difficulty encountered in securing a tight joint between the valve parts, and because the slightest particle of dirt between the seating faces causes the valve to leak to a prohibitive extent. The use of a soft metal for one of the valve parts has also been unsatisfactory because a metal soft enough to take an initial seat impression at the time the regulator is assembled and thus make a gas tight seal, is soft enough to flow under continued impact of the seat on the nozzle until the seat impression is so large that the desirable characteristics of the regulator are greatly impaired. Furthermore, as the nozzle pounds its way into the seat the force exerted by the valve closing spring is decreased and may be enough to reduce the unit pressure on the seat to a point where gas leaks through the valve. A harder metal is unsatisfactory because it requires a stronger valve closing spring to prevent leakage, and this causes a high pressure drop and excessive fluctuation.

Therefore, some of the objects of this invention are to provide a fluid pressure regulator with a valve that is non-combustible; non-corrosive; is not affected by moisture; is not affected by changes in temperature; has a long life; is easy to manufacture; is easy to assemble; is not affected by dirt and dust that passes through a strainer such as those used in regulators of this type; and is not prohibitive in cost. Other aims, objects, and novel features, will be apparent from the following description and the accompanying illustration, in which:

Fig. 1 is a view in vertical section of a fluid pressure regulator embodying our invention;

Fig. 2 is an enlarged fragmentary view in vertical section of the end of the nozzle forming the valve seat shown in Figure 1, and;

Fig. 3 is an enlarged fragmentary view in vertical section of the seating end of the valve shown in Fig. 1.

The preferred embodiment of our invention is incorporated in a fluid pressure regulator having a metal body 10 with a plurality of connected openings and cavities therein forming the high and low pressure chambers of the regulator.

Extending through the lower portion of the regulator body 10 is a horizontal opening 11 having the ends thereof closed by plugs 12 and 13 and the central portion closed by the regulator valve structure. This valve structure comprises a quill 14 threaded in a reduced central portion of opening 11 and having in turn an opening 15 longitudinally therethrough. This quill 14, and the parts therein, divide the opening 11 into a high pressure chamber 16 and a low pressure chamber 17. A suitable gas inlet, not shown, and a high pressure gauge 18 are connected by suitable openings in the body 10 with the high pressure chamber 16; and a suitable gas outlet, not shown, a low pressure gauge 19, and a control chamber 20, are connected by suitable openings with the low pressure chamber 17.

The valve mechanism comprises a nozzle 21 threaded into the high pressure end of quill 14 and having a hollow stem extending through the opening 15 in the quill to a point opposite a lateral opening 22 in the wall thereof communicating with the low pressure chamber 17. A movable valve 23 fitting loosely, in the low pressure end of opening 15 in the quill 14 is moved by the valve operating mechanism to open and close the regulator valve.

The valve operating mechanism comprises a diaphragm 24 forming the upper wall of control chamber 20; a spring 25 for moving the diaphragm downward against the fluid pressure in control chamber 20 on the under side of the diaphragm; and a bell crank 29 operated by the diaphragm for removing the pressure of valve closing spring 28 transmitted to valve 23 by push rod 27. The regulator has the usual handle 26 for manually varying the tension of spring 25 to vary the pressure in the low pressure side of the regulator, and a filtering screen 30 for removing dust and dirt from the incoming gas.

When there is no gas pressure in the regulator the control valve normally stands in open position. When in use a cylinder or tank of compressed gas, such as oxygen, is connected in the usual manner with the high pressure side of the regulator, and a gas consuming device such as an oxy-acetylene blowpipe is connected in the usual manner with the low pressure side of the regulator. When oxygen is turned into the high pressure side of the regulator it enters the high pressure chamber 16 through filter 30 and flows to gauge 18 and also through nozzle 21 past valve 23 and out through opening 22 into control chamber 20. As the pressure builds up in chamber 20 against the under side of diaphragm 24 it is forced upward against the pressure of spring 25. In moving upward it moves bell crank 29 so that its pressure against spring 28 is removed and spring 28 then moves valve 23 to closed position against nozzle 21 thereby stopping the flow of gas through the regulator When the pressure is reduced in the low pressure side of the regulator the diaphragm drops in response to the pressure of spring 25 and this movement causes bell crank 29 to compress spring 28 thereby removing its closing pressure from valve 23 which is moved to open position by the gas in the high pressure side of the regulator.

Our invention resides in the valve mechanism of a regulator such as that just described, and more specifically in the structure and form of the valve and valve seat.

The particular structure by which we overcome the objections encountered in valves of the prior art and attain the aims and objects of our invention is shown in detail in Figs. 2 and 3 which are enlarged views of the portion of the valve having the valve face and the portion of the nozzle forming the valve seat.

The nozzle 21 is preferably made of a comparatively hard, non-corrosive metal, such as that known as stainless steel. Best results have been attained with that known as Firth Sterling Stainless Steel. However, other brands or other metals or alloys having similar characteristics may be used.

The end of the nozzle 21 forming the valve seat 32 is cylindrical with a longitudinal opening 35 therethrough for the passage of fluid. The annular valve seat or face 32 is substantially flat with both the inner and outer edges thereof rounded to prevent the seat from shearing the softer valve metal when the valve closes. The flat annular valve seat 32 is narrow enough to make an initial impression in the softer face of the valve and secure a tight joint, but not so narrow that under continued use it will make an impression deep enough to impair the operating characteristics of the valve.

In the preferred form of the nozzle 21 the operating end is substantially ¼ in. in diameter with an opening .098 in. in diameter therethrough. The rounded inner edge 33 of the annular seat 32 has a radius of substantially 1/64 in., and the rounded outer edge has a radius that leaves the operating face 32 substantially 1/32 in. wide.

The surface 36 of the valve 23 that seats against the nozzle 31 is a comparatively thin sheet of soft, semiplastic, homogeneous material. This seating material is backed up with a harder resilient material that is softer than that of the nozzle. As the seating material is soft the seat 32 makes an impression therein deep enough to effect a tight joint, but as the seating material is also thin and the backing material underneath is resilient, the depth of this impression does not increase under the continued impacts of use to a point where the desirable characteristics of the regulator are impaired.

The preferred form of the valve 23 employed by us is of copper substantially ¼ in. in diameter. Its size with respect to the opening 15 in the quill 14 is such that it slides freely in the opening 14 at the same time having the least possible lateral movement. As there is no tendency for the valve to rotate in the quill this freedom from lateral motion causes the valve to strike its seat in exactly the same place each time the valve closes and a tight joint is thus insured. This point is considered quite important as the seat 32 of the nozzle is always more or less uneven, and when this uneven surface has made an impression in the soft face of the valve it is important that it seat accurately in this impression each time the valve closes. Otherwise, it would be necessary for the seat to make a new impression each time the valve closed and this continued working of the soft seating metal 37 would soon deepen the nozzle impression to a point where the valve would leak or its pressure variation would be excessive.

The seating end of the copper valve 23 has a flat surface at right angle to its longitudinal axis. Alloyed to this surface is a thin coating of a soft seating material 37 having an obtuse concoidal face 36. In practice this seating material is an alloy of substantially equal parts of lead and tin with perhaps a trace of antimony. This alloy is flowed over the end of the valve while molten and by the use of a suitable cleaning agent or flux it is caused to adhere to the surface of the valve and become alloyed thereto by a process commonly known as soldering. Then, by a suitable machining operation such as turning, the excess seating material is removed and its seating surface is given a conoidal form with each side thereof at an angle of substantially 2° from the face of the copper valve upon which it is supported. The edge of this seating material is cut down until it is very thin or is just removed, and from this edge it gradually grows thicker all the way to the center. At the point where the annular seat 32 strikes the conoidal surface 36 of the valve the seating material is substantially .0015 in. thick. The flat face of the nozzle will make an impression in the conoidal surface of the seating material with less pressure than it would in a flat surface, and on account of the thinness of the seating material at the point of contact the impression will not be deep enough to impair the operation of the regulator. Alloys other than that described may be employed for the seating material, and the seating face may have a form other than conoidal.

Another very important advantage derived from the use of a soft seating material on the valve is the ability of such material to embed the minute particles of dirt and dust that pass through the finest strainers. In our regulator we use a woven wire strainer having .0015 in. openings therein, and the dust that passes through these openings will ruin a hard rubber valve in a comparatively short time, and cause a valve having hard metal seating surfaces to leak to a prohibitive extent. The soft metal seating material of our valve will, on the other hand, flow around these particles of dust and embed them without causing the valve to leak. The unit pressure on such particles when the valve closes is extremely high so that they are mashed or pressed into the soft seating material so completely that they give no trouble whatever. It is believed that these particles of dust might cause the valve to leak after the seating material became saturated with them, but this condition has not been reached either in our tests or in practice. On the other hand, it is our experience that the strainer will become clogged with the larger particles of dirt and almost completely shut off the gas flow before the seating material will become saturated with the finer particles that pass through the strainer.

Another important quality of our new regulator valve is its ability to conduct heat away from the valve seat so that it does not have a detrimental effect on the valve materials.

When a compressible gas such as oxygen under approximately 2300 lbs. pressure is turned into a regulator valve such as that described, the compression of the gas in the chambers of the regulator causes a sharp rise in temperature that has been estimated as being something less than 1150° C., the approximate temperature reached by an adiabatic compression of an ideal gas to this pressure. This rise in temperature will have a detrimental or destructive effect on the seating surfaces of the valve unless it is conducted away and dissipated. In our valve we accomplish this desirable result by employing a valve of material such as copper having high heat conductivity. Then when oxygen is turned into our regulator valve and compressed the heat generated thereby is conducted away from the seating surfaces by the copper valve so that they are not injured.

Still another important quality of our improved valve is its extremely long life as compared to those of the prior art. From tests we have conducted it appears that a hard rubber valve that will survive from one to two million closings is exceptionally good. Some developed leaks after only nine thousand closings. Our valve, on the other hand, has been tested over a period of nine million closings and then found to be in good condition when taken down and examined.

It is evident, therefore, that we have made a useful and decided improvement in regulator valves whereby their useful life has been increased from five to fifteen or more times, and our invention is not confined to the specific structure and materials shown and described, as the various component parts may be altered in size and shape, and various equivalent materials may be substituted for those described.

We claim:

1. A fluid control valve comprising a nozzle with an annular face through which said fluid is adapted to pass; a valve; and a metal coating on said valve having a face seating upon the face of said nozzle to control the flow of said fluid; the annular face of said nozzle having round edges with the radius thereof several times the thickness of said metal coating.

2. A fluid control valve comprising a nozzle with an annular face through which said fluid is adapted to pass; a valve; and a metal coating on said valve having a face seating upon the face of said nozzle to control the flow of said fluid; the annular face of said nozzle having round edges with the radius thereof at least ten times the thickness of said metal coating.

3. A fluid control valve comprising a nozzle with an annular face through which said fluid is adapted to pass; a valve; and a metal coating on said valve having a face seating upon the face of said nozzle to control the flow of said fluid; one of said faces being flat and the other being conoidal with the angle therebetween substantially 2°.

4. A fluid control valve comprising a nozzle with an annular face through which said fluid is adapted to pass; a valve; and a metal coating on said valve having a face seating upon the face of said nozzle to control the flow of said fluid; the thickness of said metal coating where it comes in contact with the annular face of said nozzle being substantially .0015 in.

5. In a fluid pressure regulator, a control valve comprising an annular seat through which said fluid is adapted to pass; and a valve having a face cooperating with said seat to control the flow of said fluid; said face being of material soft enough to take an impression of said seat, and the edges of said seat being rounded so that they will not shear said material at the edges of said impression.

6. In a fluid pressure regulator, an annular valve seat through which fluid is adapted to pass, and a valve having a face thereof cooperating with said seat to control the flow of fluid, the portion of said valve adjacent said face being formed of resilient metal of high heat-conductivity, and the said face being provided with a thin surface coating of relatively soft, corrosion-resistant metal adapted to take an impression of said seat and overlying and bonded with the said portion of resilient metal, the edges of said seat being rounded so that they will not shear said soft metal at the edges of said impression.

7. In a fluid pressure regulator, an annular valve seat through which fluid is adapted to pass, and a metal valve having alloyed thereto a seating surface of relatively soft metal backed by a body of harder resilient metal, the edges of said valve seat being rounded so as to prevent the shearing of said soft metal at the edges of the seating surface.

8. In a fluid pressure regulator, an annular valve seat through which fluid is adapted to pass, and a metal valve having a seating surface formed of a thin layer of relatively soft metal backed by and alloyed to a body of harder resilient metal, said body of resilient metal being softer than the material forming the valve seat, the edges of said seat being rounded so that they will not shear said soft metal at the edges of said seating surface.

9. In a fluid pressure regulator, an annular valve seat of corrosion-resistant metal through which fluid is adapted to pass, and a metal valve having alloyed thereto a conoidal seating surface formed of a thin layer of a lead-tin alloy backed by a body of copper, the edges of said seat being rounded so that they will not shear said soft metal at the edges of said seating surface.

HERMAN W. CARNES.
GEORGE H. SMITH.